(12) United States Patent
Ruebben

(10) Patent No.: US 12,491,293 B2
(45) Date of Patent: Dec. 9, 2025

(54) BALLOON CATHETER WITH HYDROGEL COATING

(71) Applicant: Alexander Ruebben, Monaco (MC)

(72) Inventor: Alexander Ruebben, Monaco (MC)

( * ) Notice: Subject to any disclaimer, the term of this patent is extended or adjusted under 35 U.S.C. 154(b) by 886 days.

(21) Appl. No.: 17/773,881

(22) PCT Filed: Nov. 2, 2020

(86) PCT No.: PCT/EP2020/080655
§ 371 (c)(1),
(2) Date: May 3, 2022

(87) PCT Pub. No.: WO2021/089470
PCT Pub. Date: May 14, 2021

(65) Prior Publication Data
US 2022/0339327 A1  Oct. 27, 2022

(30) Foreign Application Priority Data
Nov. 4, 2019 (DE) ............ 10 2019 129 596.3

(51) Int. Cl.
*A61L 29/14* (2006.01)
*A61L 29/08* (2006.01)
*A61M 25/10* (2013.01)

(52) U.S. Cl.
CPC ........... *A61L 29/145* (2013.01); *A61L 29/085* (2013.01); *A61M 25/10* (2013.01); *A61M 2025/105* (2013.01); *A61M 2025/1088* (2013.01)

(58) Field of Classification Search
CPC .......... A61L 29/145; A61L 29/085; A61L 2300/222; A61L 2300/236; A61L 2300/416; A61L 2300/43; A61L 29/16; A61M 25/10; A61M 2025/105; A61M 2025/1088; A61M 25/01
See application file for complete search history.

(56) References Cited

U.S. PATENT DOCUMENTS

2003/0018353 A1* 1/2003 Yang ............ A61M 25/0045
606/194
2005/0080477 A1* 4/2005 Sydney ............... A61F 2/958
623/1.11

FOREIGN PATENT DOCUMENTS

| EP | 3228348 | 10/2017 |
|---|---|---|
| WO | WO 2016/050303 | 4/2016 |
| WO | WO 2017/139357 | 8/2017 |

OTHER PUBLICATIONS

Internationaler Recherchenbericht und Schriftlicher Bescheid [International Search Report and the Written Opinion] Dated Feb. 22, 2021 From the International Searching Authority Re. Application No. PCT/EP2020/080655 and Its Translation of Search Report Into English. (11 Pages).

* cited by examiner

*Primary Examiner* — Theodore J Stigell

(57) ABSTRACT

The invention relates to a balloon catheter (1) to be introduced into the blood vessel system of the human or animal body, said catheter having a longitudinally extending shaft (2), with the balloon catheter (1) comprising a distal portion (A) in which a balloon (3) is arranged that is expandable by the supply of a fluid through a lumen (9) extending through the shaft (2), with the distal tip (8) of the balloon catheter (1) being provided with a coating consisting of a hydrogel (7). The invention provides a balloon catheter (1) capable of easily passing through constricted areas in blood vessels.

18 Claims, 2 Drawing Sheets

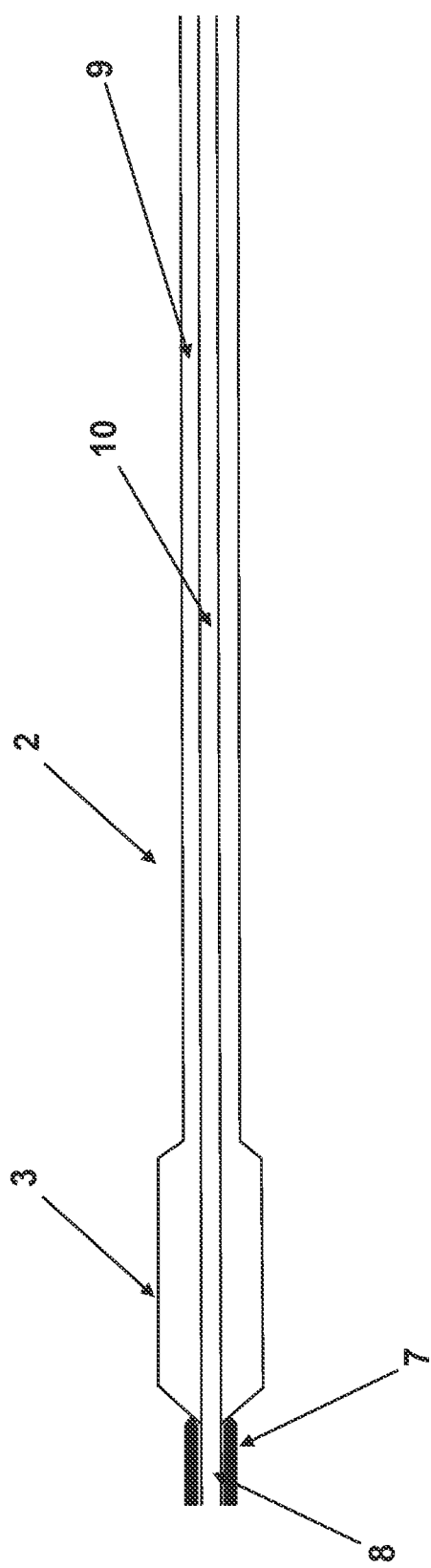

BALLOON CATHETER WITH HYDROGEL COATING

RELATED APPLICATIONS

This application is a National Phase of PCT Patent Application No. PCT/EP2020/080655 having International filing date of Nov. 2, 2020, which claims the benefit of priority of German Patent Application No. 10 2019 129 596.3 filed on Nov. 4, 2019. The contents of the above applications are all incorporated by reference as if fully set forth herein in their entirety.

FIELD AND BACKGROUND OF THE INVENTION

The invention relates to a balloon catheter for the introduction into the blood vessel system of the human or animal body, said catheter being provided with a longitudinally extending shaft, with the balloon catheter having a distal portion in which a balloon is arranged that is expandable by the supply of a fluid through a lumen extending through the shaft.

The use of balloon catheters is nowadays standard practice in everyday clinical routine. Their use in the context of intravascular interventions usually involves the widening of constricted vessel areas, either by means of the balloon catheter itself or in combination with other medical devices such as balloon-expandable stents, for example. In case of percutaneous transluminal angioplasty, a balloon catheter is navigated to the site of the stenosis via a guidewire and guide catheter and expanded by means of applying a pressurized fluid (approximately 4 to 12 bar). Deposits present in the area of the stenosis are pressed into the vessel wall. Moreover, a stent (vascular endoprosthesis) may be placed in position with a view to keeping the blood vessel permanently open. To prevent a stenosis from recurring due to vasoconstrictive overgrowth of the widened site, drug-eluting balloon catheters can also be put to use, which are designed to dispense a drug such as paclitaxel at the site of vasoconstriction during expansion. When the treatment has been completed and the balloon is subsequently in collapsed state, the balloon catheter is withdrawn from the vascular system and removed.

The femoral artery in the groin is often chosen as the access point for balloon catheters, as well as other catheters, for example for placing a stent or inserting other implants into the blood vessel system. At least partially, the femoral artery runs relatively superficially and, for that reason, is easily accessible to the treating physician. Moreover, catheters of relatively large lumen with large outer diameters can be inserted via the femoral artery (inguinal artery).

Due to the fact that the catheter must be advanced over relatively long distances from the access site to the target position, which may be, for example, in the region of the heart or brain, low frictional resistance is advantageous. Transurethral Foley catheters have been known to be coated with a hydrogel immediately prior to use, said hydrogel increasing the lubricity of the catheter when inserted into the urethra. At the same time, the urethra itself is usually provided with the hydrogel. However, the catheters used in these applications are not meant to be inserted into the blood vessel system; a precoating with a hydrogel is not commonly applied to vascular system catheters.

In some cases, balloon catheters are also known from prior art, for example publication WO 2017/139357 A1, where the balloon itself has been provided with a hydrogel coating in which an active substance has been embedded to be applied via the balloon. In this case, however, the hydrogel does not serve as a means to increase the lubricity of the balloon catheter, but rather as a matrix for the drug to be delivered.

SUMMARY OF THE INVENTION

Based on the state of the art described hereinbefore, it is therefore the objective of the invention to provide a balloon catheter that can be advanced to the target position particularly well, even over relatively long distances and through blood vessels of narrow lumen.

As proposed by the invention, this objective is reached by the provision of a balloon catheter to be introduced into the blood vessel system of the human or animal body, said catheter having a longitudinally extending shaft, with the balloon catheter comprising a distal portion where a balloon is arranged that is expandable by the supply of a fluid through a lumen extending through the shaft, with the distal tip of the balloon catheter being provided with a coating consisting of a hydrogel.

In contrast to the balloon catheters described above, the hydrogel is thus applied to the distal tip of the balloon catheter according to the invention and not, or at least not primarily, to the balloon itself. An application to the distal tip makes sure that the balloon catheter can be advanced easily, even when narrow passages occur in the blood vessel system. On passing through such an area of constriction, hydrogel applied to the distal tip of the balloon catheter is rather displaced or pushed further proximally, resulting in the balloon catheter having particularly good lubricity distally.

Hydrogel can be applied in such a manner that it initially remains localized at the distal tip of the balloon catheter. When the hydrogel comes into contact with blood during insertion of the balloon catheter into the vasculature, it swells due to water absorption and forms the highly lubricious gel, with a partial peptization and thus a gel-to-sol transition possibly occurring.

As a result of the hydrogel being applied, not only the advancement of the balloon catheter in the blood vessel is facilitated, but also the insertion of the balloon catheter into an insertion aid or introducer sheath, which is usually placed in the femoral artery region. Such catheter introducers or sheaths are usually made of plastic material and often provided with a membrane that must first be penetrated by the balloon catheter to be pushed forward.

Preferably, the application of the hydrogel coating is limited to the distal tip of the balloon catheter. In particular, the balloon catheter should advantageously not or only partially be coated with hydrogel. For example, although a portion of the balloon catheter could also be provided with the hydrogel coat beyond the immediate distal tip area, this coating, however, should extend from the distal end to no more than the middle of the balloon, preferably only over the distal third of the balloon. It is further preferred that the coating with the hydrogel only extends over the most distally located quarter or the most distally situated fifth of the balloon when looking in the longitudinal direction of the balloon catheter in each case.

The length of the hydrogel-coated region of the balloon catheter may, for example, be 10 cm max., preferably max. 5 cm, more preferably max. 3 cm, more preferably max. 2 cm, more preferably max. 1 cm, with in each case reference being made to the distance from the distal end of the balloon catheter in the proximal direction.

By coating only the distal tip of the balloon catheter with hydrogel, the total amount of hydrogel applied is kept at a low level. On the other hand, the distally applied hydrogel coating performs the desired function, as it is primarily the distal tip of the balloon catheter that is important for improving advanceability within a blood vessel. Once the distal tip together with the immediately adjoining balloon section has overcome an area of constriction, the other portions of the balloon catheter will normally follow without problems. What is more, it should be noted that hydrogel applied to the distal tip, after activation through the absorption of water, has a consistency that causes it just by passing through the constricted region, to be distributed to some extent in proximal direction, resulting in good overall lubricity of the balloon catheter in the distal section.

The amount of hydrogel applied should be chosen so that on the one hand it can fulfill its function of improving the advanceability of the balloon catheter, but on the other hand it should be as small as possible. The hydrogel is an additive substance that should only be introduced into the blood vessel system in the smallest possible quantity. When used in larger quantities, for example, some of the substances that can be employed as hydrogels are known to cause side effects or allergic reactions, including anaphylactic shock. Especially because the amount of coating applied should be kept relatively small, it is of advantage to coat only the distal tip of the balloon catheter or only small areas of the balloon catheter adjacent to the distal end. The total amount of hydrogel applied is, preferably, ≤5 mg, more preferably 3 mg, further preferably ≤1 mg. As a rule, the hydrogel coating is free of active substances.

Expediently, the hydrogel coating per area is ≤2.5 $\mu g/mm^2$, further preferably ranges between 0.5 and 2.5 $\mu g/mm^2$, with only the hydrogel-coated area of the balloon catheter being considered in each case. In doing so, a sufficiently large effect is achieved without running the risk of an excessive amount of hydrogel being carried away and absorbed by the blood.

As suitable hydrogel materials, customary substances can be employed, in particular polysaccharides, modified polysaccharides, methacrylates, polypeptides, proteins or even synthetic polymers. Modified polysaccharides are understood to be, in particular, polysaccharides, or their monomer units, which are functionalized in a special way. For example, individual monomer components may have amino or amide functions, carboxy functions or the like, or may be partially oxidized. Examples include, inter alia, polyaminosaccharides such as chitosan or hyaluronic acid with an N-acetylamino function and glucoronic acid units. The hydrogels can be cross-linked or non-cross-linked.

In particular, the hydrogel may contain the following: Dextran, polyhydroxyethyl methacrylate, a polyacrylate, chitosan, oxidized cellulose, polyvinylpyrrolidone, polyethylene glycol, hyaluronic acid, agarose, starch, starch derivatives such as hydroxyethyl starch, a poloxamer, gelatin, fibrin, polyvinyl alcohol, propylene glycol, polyacrylic acid, methyl cellulose, carboxymethyl cellulose, hydroxypropyl methyl cellulose, hydroxyethyl cellulose, hydroxypropyl cellulose, alginate, amylose, amylopectin, xanthan, xyloglucan, peptidoglycan, polyoxyethylene derivatives, a silicone and/or elastin. Polysaccharides are preferred.

Within the context of the invention, proximal is understood to mean in the direction of the exterior of the body, i.e., toward the attending physician, while distal shall be understood to denote the opposite direction, that is, toward the target site. The longitudinal direction is the direction from proximal to distal or vice versa. Radial refers to the plane perpendicular to the longitudinal axis of the balloon catheter.

Typically, a second lumen extends at least partially longitudinally through the shaft, with said lumen serving to accommodate a guidewire. This lumen may extend up to the distal end of the balloon catheter, that is, the guidewire may exit the balloon catheter at its distal end. Accordingly, a guidewire can first be moved to the desired target position before the balloon catheter itself is advanced to the target position via the guidewire.

In this context, essentially two different systems are known from prior art, namely over-the-wire (OTW) and rapid exchange (Rx) balloon catheters. The balloon catheter proposed by the invention can be either an OTW or an Rx balloon catheter. While in an OTW catheter the lumen for the guidewire extends from proximal to distal along the entire length of the catheter, an Rx catheter is designed to have a separate guidewire access port (Rx port) where the guidewire exits the catheter significantly distal to the proximal end of the catheter. Accordingly, in the case of an OTW balloon catheter, the lumens for fluid delivery and guidewire extend concentric or parallel to each other from the proximal end of the catheter up to the balloon, whereas in the event of an Rx catheter, this is only the case between the Rx port and the balloon. On the other hand, the section between the Rx port and the proximal end only has one lumen for fluid delivery. The lumens may be concentric in the areas where the catheter has two lumens, so that the narrower inner lumen accommodating the guidewire passes through the wider outer lumen via which fluid delivery takes place.

The term balloon as it is used within the scope of the present invention shall be understood to define the element of a balloon catheter that can be expanded by feeding in a fluid, irrespective of the shape or material of said expandable element. Basically, balloon catheters are sufficiently known from prior art and comprise an elongated shaft extending from proximal to distal as well as a balloon which is arranged in the distal section. As regards its dimensions such a catheter is suitably designed for the insertion into the respective blood vessel system. The exact dimensions of such catheters may vary depending on whether the blood vessel, for example, is a coronary artery, an intracranial blood vessel or an artery in the lower leg. Moreover, the balloon catheter is provided with means for delivering a fluid to the balloon, said means comprising a delivery/supply lumen extending over the length of the balloon catheter. Normally, each of the lumens extending through the shaft are formed by a hose-like or tubular tube.

In this context, the term tube is used to denote a conduit or hose that extends at least partially through the balloon catheter in longitudinal direction and has a lumen running through the interior of the tube. The tube can have the shape of a hollow cylinder of a circular or elliptical cross-section, but this is not a mandatory requirement. As far as the cross-section is concerned, almost any other shape is also conceivable. However, a circular or perhaps elliptical cross-section is to be viewed as an advantage since one tube can be easily passed through the other tube, usually running the second tube through the first tube.

In the event of a compliant or semi-compliant balloon, the balloon may be made at least in part of an elastic material. As elastic material in this case a polyurethane, a polyolefin copolymer, a polyethylene, or a silicone can be used, for example. Other materials that can be employed are thermoplastic elastomers, in particular polyether block amides (PEBA). This is a thermoplastic elastomer obtainable by polycondensation of a carboxylic acid polyamide with a polyether having terminal OH groups. In particular, PEBA is marketed under the tradename of PEBAX® by the Arkema company. Polyamides such as nylon (polyhexamethylene adipamide) or those offered for sale under the tradename of Grilamid® by the company of EMS-GRIVORY may also be employed.

The pressure applied to the balloon to bring about its expansion in the blood vessel typically ranges between 4 and 12 bar, preferably between 6 and 8 bar. The fluid to be used may, for example, be water mixed with contrast medium or a saline solution mixed with contrast medium. The dimensions of the balloon may vary greatly depending on the field of application; for example, the diameter in the expanded state may range from approx. 1 mm to approx. 50 mm, and the length may range between approx. 5 mm and approx. 300 mm. However, the dimensions may also deviate from this, for example, when using the balloon/balloon catheter for applications in veterinary medicine.

The shaft of the balloon catheter may be made of customary materials, although different materials may also be put to use, for example, to make the distal section softer than the proximal section. Commonly used materials are polymers such as polyethylene, polyurethane, polyvinyl chloride, polyamides, polyimides, silicones, polyetheramides, polytetrafluorethylene, EPDM (ethylene-propylene-diene rubber), polyether block amides (PEBA) or polyamides marketed under the tradename of Grilamid® by the company EMS-GRIVORY. If so desired, in particular the proximal areas of the shaft can also be made of metal, e.g. stainless steel.

The length of the shaft, including the area where the balloon is located but excluding hubs or similar connectors proximal to the shaft, is typically at least 160 cm, preferably at least 165 cm. A typical length ranges between 160 and 180 cm.

The balloon catheter proposed by the invention can also be used for a stent placement (endoprosthesis) in the body lumen. Stents are tubular supporting structures implanted into a blood vessel, with a view to keeping it permanently open. Stents of this type may be of self-expanding design or expanded with the help of a balloon. For this purpose, the stent is crimped onto the balloon and introduced into the blood vessel with the aid of the balloon catheter. At the desired placement site, the balloon is inflated by feeding in a fluid, which also causes the stent to expand and thus be anchored in the blood vessel. Moreover, using the inventive balloon enables the relevant active substance to be applied to the blood vessel wall. Finally, the balloon is deflated and removed from the blood vessel whereas the stent remains in place in the blood vessel.

If so desired, the balloon catheter may be provided with a balloon coated with an active substance (drug eluting balloon). The active substances or agents are preferably selected from the following: Tretinoin, orphan receptor agonists, elafin derivatives, corticosteroids, steroid hormones, paclitaxel, rapamycin (sirolimus), tacrolimus, hydrophobic proteins, heparin and/or hormone-like or cell proliferation modifying substances. Particularly preferred are paclitaxel, tacrolimus and sirolimus.

At the proximal end of the balloon catheter, adjacent to the shaft, a so-called catheter hub is usually arranged, which is a connector for the device used for fluid delivery and pressurization. The connector, for example, can be a conventional luer or luer-lock connection. It is particularly expedient to provide two Luer lock connectors, typically female connectors, one for connecting the first lumen to a balloon dilator and another for inserting the guidewire into the balloon catheter. The connectors may, for example, consist of a polycarbonate. At its proximal end the guidewire extending through the balloon catheter may be held by means of a torquer which facilitates handling the usually very thin guidewire.

Typically, the deflated balloon of the balloon catheter is laid in folds. As required by the size of the balloon, different numbers of folds may be formed, which are subsequently wound up around the axis of the catheter in the same direction. This arrangement ensures a significant reduction of the diameter. With a view to reducing the diameter even more, various methods are proposed according to the prior art. An example of this is the so-called cutback method, by means of which the folded balloon with the tube pulled over it is passed through a usually funnel-like nozzle.

This causes the tube to be stretched resulting in a reduction of its diameter, which consequently also reduces the diameter of the balloon arranged within the tube. Such a method has been described in publication WO 2016/050303 A1.

Over the length of the balloon catheter radiopaque markers may be arranged at various positions, said markers serving the purpose of making the catheter visible on radiographs. In particular, said markers may be manufactured of platinum or a platinum alloy.

BRIEF DESCRIPTION OF THE SEVERAL VIEWS OF THE DRAWINGS

Further elucidation of the invention is provided through the enclosed figures by way of examples, where

FIG. 2 is a longitudinal section of the distal portion of the shaft of the balloon catheter shown in FIG. 1.

DESCRIPTION OF SPECIFIC EMBODIMENTS OF THE INVENTION

Figure 1:
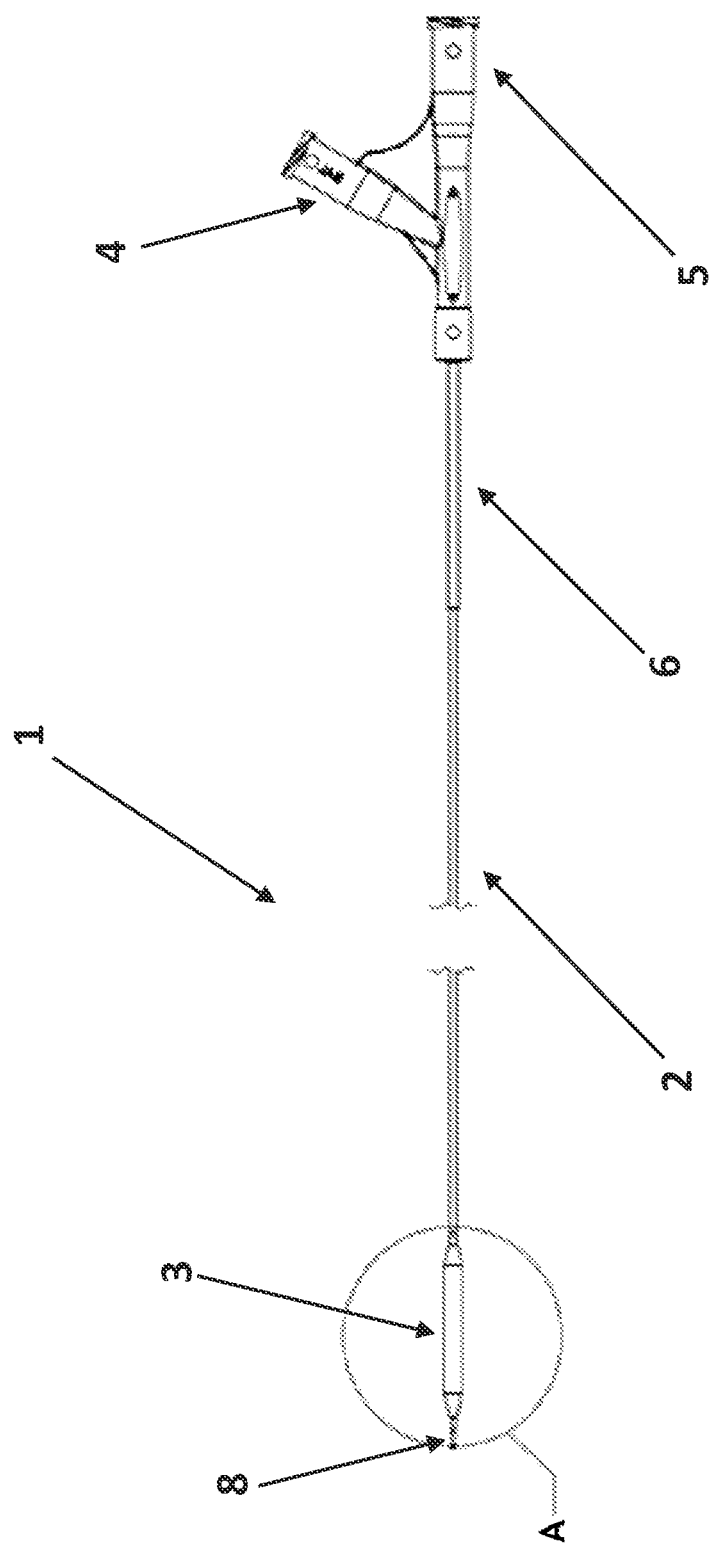
FIG. 1: is a side view of the balloon catheter according to the invention.

In FIG. 1, the balloon catheter 1 proposed by the invention is shown in side view, where in the representation chosen here right means proximal and left means distal. The balloon catheter 1 comprises a shaft 2 extending in longitudinal direction, the outer diameter of said shaft being larger in the proximal section 6, of which only a short segment is shown here, than further distally. The section of the shaft 2 in which the balloon 3 is located is identified by the letter A. The balloon 3 is shown in the unexpanded but not folded state. A first lumen for the fluid delivery as well as a second lumen for accommodation of the guidewire extend through the shaft 2 (not shown here), with each of the two lumens being formed by a tube. Distal to the balloon 3, the distal tip 8 can be seen.

Proximally, two catheter hubs in the form of luer-lock connections 4, 5 are arranged at the proximal section 6 of the shaft 2, with connection 4 serving to deliver fluid into the first lumen by means of a balloon dilator and connection 5 serving to introduce the guidewire into the second lumen.

In FIG. 2, only the distal part of the shaft 2 is shown. A first lumen 9 is configured to accommodate the second lumen 10, that is, the second lumen 10 extends longitudinally through the first lumen 9. The first lumen 9 is in contact at its distal end with the balloon 3, which can be expanded by supplying fluid through the first lumen 9. The second lumen 10, on the other hand, has an opening at the distal end and is used to accommodate the guidewire, which is not shown here.

The distal tip 8 is located at the distal end of the shaft 2. Said tip is coated radially, i.e. over its circumference, with a hydrogel 8. The applied coating of hydrogel 8 may extend marginally over the balloon 3, but this is not mandatory; rather, it is advantageous for the hydrogel coating 8 to be primarily confined to the distal tip 8. When the balloon catheter 1 is passing through a constricted area in the blood vessel, the hydrogel coating 8 automatically spreads partially further proximally in the longitudinal direction, so that good lubricity and advanceability of the balloon catheter 1 is ensured.

What is claimed is:

1. Balloon catheter to be introduced into the blood vessel system of the human or animal body, said balloon catheter having a longitudinally extending shaft, with the balloon catheter comprising a distal portion in which a balloon is arranged that is expandable by the supply of a fluid through a lumen extending through the shaft, wherein the balloon catheter has a distal tip that is provided with a coating comprising a hydrogel, wherein the area of the coating with hydrogel, viewed in the longitudinal direction, extends from the distal tip of the balloon catheter to maximally the middle of the balloon.

2. Balloon catheter according to claim 1, wherein the area of the coating with hydrogel, viewed in the longitudinal direction, maximally covers the distal third of the balloon.

3. Balloon catheter according to claim 2, wherein the coating with hydrogel is confined to the distal tip of the balloon catheter.

4. Balloon catheter according to claim 1, wherein the length of the area of the balloon catheter coated with hydrogel amounts to maximally 5 cm.

5. Balloon catheter according to claim 4, wherein the length of the area of the balloon catheter coated with hydrogel amounts to maximally 3 cm.

6. Balloon catheter according to claim 5, wherein the length of the area of the balloon catheter coated with hydrogel amounts to maximally 2 cm.

7. Balloon catheter according to claim 1, wherein the amount of hydrogel per coated unit area of the balloon catheter amounts to ≤2.5 µg/mm².

8. Balloon catheter according to claim 7, wherein the amount of hydrogel per coated unit area of the balloon catheter amounts to 0.5 to 2.5 µg/mm².

9. Balloon catheter according to claim 1, wherein the total amount of hydrogel applied to the balloon catheter amounts to ≤5 mg.

10. Balloon catheter according to claim 9, wherein the total amount of hydrogel applied to the balloon catheter amounts to ≤3 mg.

11. Balloon catheter according to claim 10, wherein the total amount of hydrogel applied to the balloon catheter amounts to ≤1 mg.

12. Balloon catheter according to claim 1, wherein the hydrogel is free of active substances.

13. Balloon catheter according to claim 1, wherein the hydrogel comprises a polysaccharide, a modified polysaccharide, a methacrylate, a polypeptide, a protein or a synthetic polymer.

14. Balloon catheter according to claim 1, wherein the hydrogel comprises dextran, polyhydroxyethyl methacrylate, a polyacrylate, chitosan, oxidized cellulose, polyvinylpyrrolidone, polyethylene glycol, hyaluronic acid, agarose, starch, starch derivatives such as hydroxyethyl starch, a poloxamer, gelatin, fibrin, polyvinyl alcohol, propylene glycol, polyacrylic acid, methyl cellulose, carboxymethyl cellulose, hydroxypropyl methyl cellulose, hydroxyethyl cellulose, hydroxypropyl cellulose, alginate, amylose, amylopectin, xanthan, xyloglucan, peptidoglycan, polyoxyethylene derivatives, a silicone or elastin.

15. Balloon catheter according to claim 1, wherein a second lumen extends at least partially through the shaft in the longitudinal direction, said second lumen serving to accommodate a guidewire.

16. Balloon catheter according to claim 1, wherein the balloon is coated with one or several active substances.

17. Balloon catheter according to claim 16, wherein the active substance or agent used is selected from the following group: Tretinoin, orphan receptor agonists, elafin derivatives, corticosteroids, steroid hormones, paclitaxel, rapamycin, tacrolimus, hydrophobic proteins, heparin or hormone-like or cell proliferation-modifying substances.

18. Balloon catheter according to claim 1, wherein one or several Luer lock connectors are arranged adjacent to a proximal end of the shaft.

\* \* \* \* \*